United States Patent
Vivier

[11] Patent Number: 5,842,611
[45] Date of Patent: Dec. 1, 1998

[54] DISPENSING DEVICE

[76] Inventor: Jacobus Lodewickus Vivier, P.O. Box 42, Verkeerdevlei, 9401, South Africa

[21] Appl. No.: 933,282

[22] Filed: Sep. 18, 1997

[30] Foreign Application Priority Data

Sep. 19, 1996 [ZA] South Africa ............................ 96/7936

[51] Int. Cl.⁶ ...................................................... B67D 5/40
[52] U.S. Cl. .......................... 222/256; 222/309; 222/380; 222/496
[58] Field of Search ..................................... 222/253, 255, 222/256, 309, 340, 341, 380, 496

[56] References Cited

U.S. PATENT DOCUMENTS

| | | | |
|---|---|---|---|
| 1,901,148 | 3/1933 | Creveling | 222/253 X |
| 2,496,821 | 2/1950 | Smith | 222/385 |
| 3,092,330 | 6/1963 | Ridenour et al. | 239/333 |
| 3,211,191 | 10/1965 | Honisch | 222/253 X |
| 3,227,325 | 1/1966 | Bates | 222/309 |
| 3,250,441 | 5/1966 | Levowitz | 222/309 |
| 3,510,172 | 5/1970 | Pekrul | 303/6 |

FOREIGN PATENT DOCUMENTS

0065506A1  11/1982  European Pat. Off. .
2386809    11/1978  France .
2459487A1  7/1975   Netherlands .

*Primary Examiner*—Kevin P. Shaver
*Attorney, Agent, or Firm*—Senniger, Powers, Leavitt & Roedel

[57] ABSTRACT

A fluid-operated dispensing device 10 includes a vessel 12 for defining a chamber 14 in which fluid is received. The vessel 12 also defines an inlet 18, a first outlet 24 and a second outlet 26. The inlet 18 has a greater cross sectional area than that of the second outlet 26. A first closure 28 is operatively arranged with respect to the inlet 18. The first closure 28 moves into an open position when pressure at the inlet 18 is greater than pressure within the chamber 14. The first closure 28 moves into a closed position when pressure within the chamber 14 is at least equal to pressure at the inlet 18. A second closure 50 is operatively arranged with respect to the second outlet 26. The second closure 50 moves into an open position when pressure within the chamber 14 is greater than pressure at the inlet 18. The second closure 50 moves into a closed position when pressure at the inlet 18 is at least equal to pressure within the chamber 14.

8 Claims, 3 Drawing Sheets

DISPENSING DEVICE

BACKGROUND OF THE INVENTION

THIS INVENTION relates to a dispensing device. More particularly, this invention relates to a fluid-operated dispensing device.

SUMMARY OF THE INVENTION

According to the invention, there is provided a fluid-operated dispensing device which includes a chamber defining means for defining a chamber in which fluid is received, in use, the chamber defining means further defining an inlet which opens into the chamber and a first outlet and a second outlet, both of which open into the chamber, the inlet having a greater cross sectional area than the second outlet;

a first closure means operatively arranged with respect to the inlet to be displaceable between a closed position in which the inlet is closed and an open position in which the inlet is open, the first closure means being configured to move into its open position when fluid pressure at the inlet is greater than fluid pressure within the chamber and to move into its closed position when fluid pressure within the chamber is at least equal to fluid pressure at the inlet; and a second closure means operatively arranged with respect to the second outlet to be displaceable between a closed position in which said second outlet is closed and an open position in which said second outlet is open, the second closure means being configured to move into its open position when fluid pressure within the chamber is greater than fluid pressure at the inlet and to move into its closed position when fluid pressure at the inlet is at least equal to fluid pressure within the chamber.

The dispensing device may include an operating means in fluid communication with the first outlet for varying the fluid pressure in the chamber to permit operation of both closure means.

The operating means may include a cylinder mounted on the chamber defining means. An interior of the cylinder may be in fluid communication with the first outlet. A plunger may be sealingly and slidably located within the cylinder. It will be appreciated that movement of the plunger will effect fluid pressure variation within the chamber.

The operating means may also include an adjustable stop arranged on the cylinder and the plunger so that the extent of reciprocal movement of the plunger can be adjusted.

The dispensing device may include an urging means arranged within the chamber to bias the first and second closure means into their closed positions. Thus, when not in use, the inlet and the second outlet are closed.

In one embodiment, the first closure means and the urging means may both be defined by a bellows-like element. The second closure means may be mounted on one end of the bellows-like element. An opposed end of the bellows-like element may be displaceable towards and away from the inlet between the closed and open positions.

In another embodiment, the urging means may be in the form of a spring interposed between the first closure means and the second closure means.

The chamber defining means may include an insert which defines the inlet, the first closure means bearing against the insert when the first closure means is in its closed position. A position of the insert may be adjustable relative to the chamber of the chamber defining means to adjust relative pressures at the inlet and in the chamber necessary to permit operation of both closure means.

The invention is now described, by way of examples, with reference to the accompanying drawings.

DETAILED DESCRIPTION OF THE DRAWINGS

Figure 1:
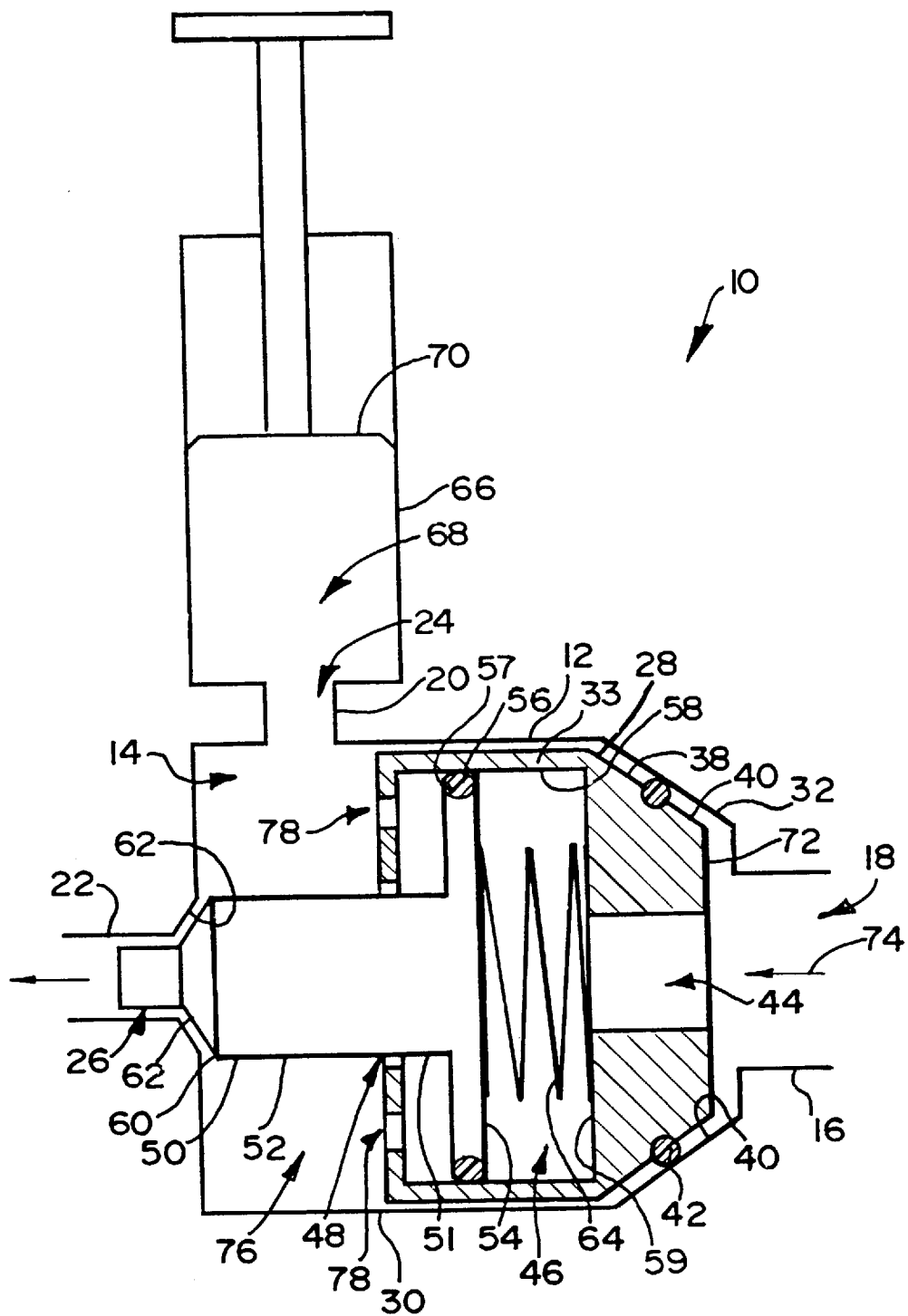
FIG. 1 shows, schematically, a fluid-operated dispensing device, in accordance with a first embodiment of the invention.

In FIG. 1, reference numeral 10 generally indicates a fluid-operated dispensing device, in accordance with a first embodiment of the invention.

The dispensing device 10 includes a chamber defining means in the form of a vessel 12 which defines a chamber 14 in which a liquid is received, in use.

A wall 30 of the vessel 12 defines an inlet 18 which opens into the vessel 12. An inlet pipe 16 is attached to the vessel 12 at the inlet 18.

The wall 30 also defines a first outlet 24 and a second outlet 26. A first outlet pipe 20 and a second outlet pipe 22 are connected to the vessel 12 at the first and second outlets 24, 26, respectively.

A first closure 28 is arranged within the chamber 14 to be displaceable between a closed position in which the inlet 18 is closed and an open position in which the inlet 18 is open. The wall 30 of the vessel 12 and the first closure 28 are both circular cylindrical. That portion 32 of the wall 30 defining the inlet 18 and a corresponding portion 38 of the first closure 28 define complementary seating surfaces 40. A rubber O-ring 42 is arranged on the portion 38 to bear against the surface 40 of the wall 30 so that the inlet 18 can be sealed closed.

A body 33 of the first closure 28 defines a passage 44 and a circular cylindrical volume 46, the passage 44 serving to direct liquid from the inlet 18 into the cylindrical volume 46.

The body 33 has a circular opening 48 defined therein between an outlet side of the first closure 28 and the cylindrical volume 46.

A second closure 50 extends from within the cylindrical volume 46 through the opening 48 towards the second outlet 26. The second closure 50 is also arranged within the chamber 14 to be displaceable between a closed position in which the second outlet 26 is closed and an open position in which the second outlet 26 is open.

The second closure 50 comprises a rod 52 which is received through the opening 48. One end 51 of the rod 52 within the cylindrical volume 46 has a flange 54 fixed thereto. An edge 56 of the flange 54 has an O-ring 57 mounted thereon so that the flange 54 is sealingly and slidably engaged with an inner surface 58 of that part of the body 33 which defines the cylindrical volume 46. An opposed end 60 of the rod 52 and that portion of the wall 30 which defines the second outlet 26 have complementary, tapered, seating formations 62 defined thereon so that the end 60 can sealingly close the second outlet 26. To effect sealing, the end 60 of the rod 52 is of a resiliently flexible material.

A spring 64 is positioned between the flange 54 and a bearing surface 59 to urge the first and second closures 28, 50 into their closed positions in which the inlet 18 and the second outlet 26 are both closed, prior to use.

The first outlet pipe 20 is connected to a cylinder 66 so that a volume 68 defined by the cylinder 66 is in fluid communication with the chamber 14.

A plunger 70 is slidably and sealingly arranged within the cylinder 66.

Prior to use, the inlet 18 and the second outlet 26 are both closed by the first closure 28 and the second closure 50, respectively. The body 33 defines a pressure face 72 which faces towards the inlet 18. Liquid enters the passage 44 in the direction of an arrow 74. At this stage, since the pressure at the inlet 18 is greater than the pressure within the chamber 14 on the outlet side of the flange 54, the liquid acts on the pressure face 72 to displace the seating surface 40 of the first closure 28 away from that of the wall 30. Also, at this stage, the pressure on the pressure face 72 exceeds that arising due to the spring 64 bearing against the bearing surface 59. This serves to compress the spring 64 thereby urging the seating formations 62 more securely together. Liquid enters a volume 76 of the chamber 14 on the outlet side of the flange 54. The liquid moves through the first outlet 24 into the cylinder 66 to urge the plunger 70 away from the first outlet 24 so that the plunger 70 can bear against a stop (not shown).

It will be appreciated that, once the plunger 70 stops moving, the pressure in the volume 76 and the pressure at the inlet 18 become equal. The spring 64 then serves to urge the first closure 28 back into its closed position.

Transfer ports 78 are defined in the body 33 to permit fluid to flow into the cylindrical volume 46. When the plunger 70 is depressed, the liquid passes back through the first outlet 24 and through the transfer ports 78 to act on the flange 54. Since the pressure on the outlet side of the flange 54 is now greater than the pressure at the inlet 18, the second closure 50 moves against the spring 64 into its open position. Also, the first closure 28 moves more securely into its closed position.

Thus, liquid is discharged from the second outlet 26. Once the plunger 70 is released, pressure within the volume 76 is again less than that at the inlet 18 and the above process can be repeated.

Figure 2:
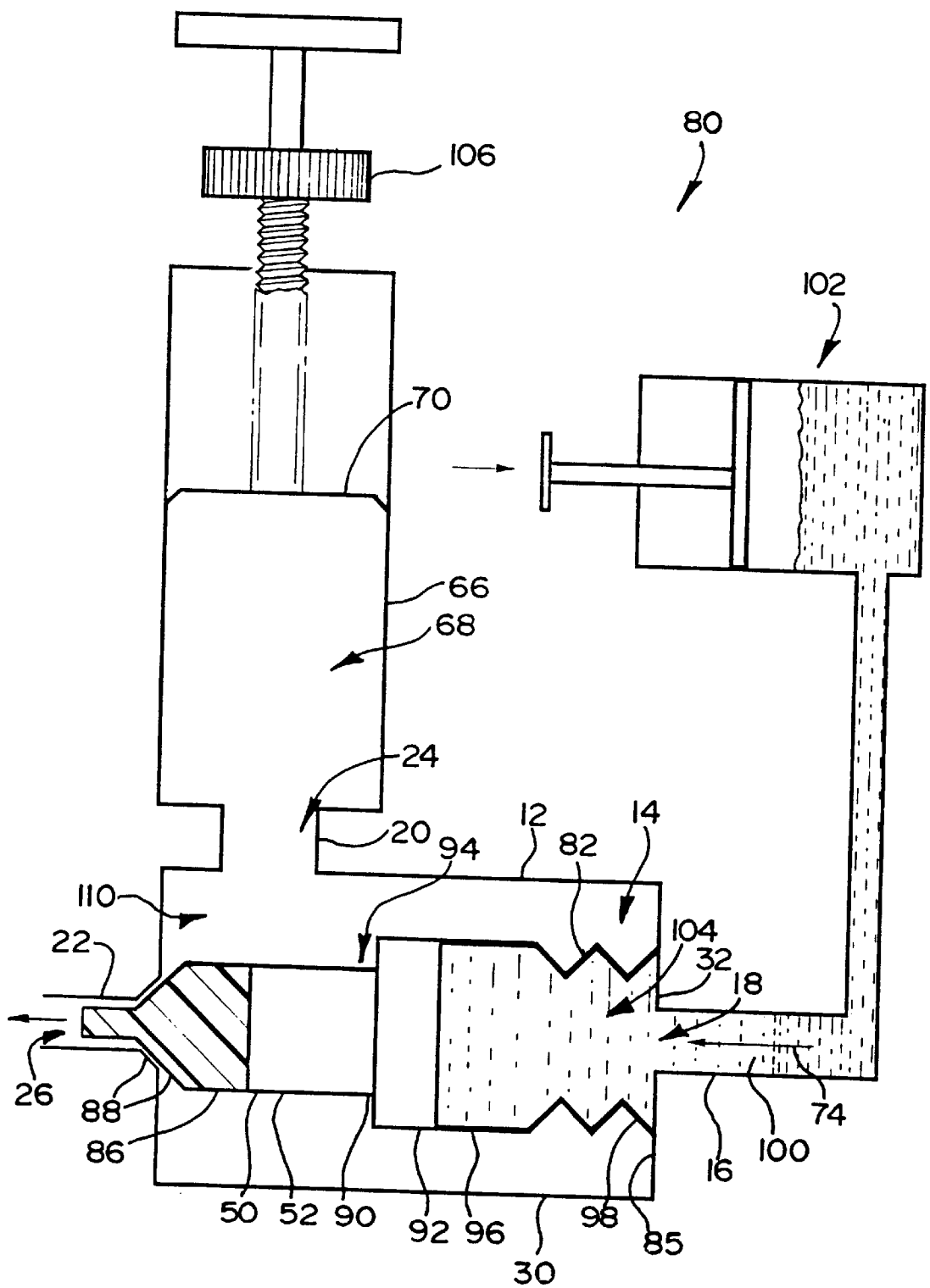
FIG. 2 shows, schematically, a fluid-operated dispensing device in accordance with a second embodiment of the invention.

In FIG. 2, reference numeral 80 generally indicates a fluid-operated dispensing device in accordance with a second embodiment of the invention. With reference to FIG. 1, like reference numerals refer to like parts, unless otherwise specified.

With the dispensing device 80, the first closure is in the form of a bellows 82.

The second closure 50 also includes a rod 52. One end 60 of the rod 52 has a rubber seal 86 mounted thereon. The rubber seal 86 and the second outlet 26 define complementary seating formations 88 so that, when the second closure 50 is in its closed position, the second outlet 26 is sealed closed.

An opposed end 90 of the rod 52 has a disc 92 mounted thereon. The disc 92 and the rod 52 are shaped so that a shoulder 94 is defined between the rod 52 and the disc 92.

One end 96 of the bellows 82 is attached to a free side of the disc 92. The bellows 82 is shaped so that an opposed end 98 of the bellows 82 can be displaced towards and away from a bellows seat 85 defined by a portion of the wall 30 at the inlet 18, between the closed and open positions. A spring (not shown) may be wound about the bellows 82 so that, initially, the bellows 82 and the second closure 50 are in their closed positions.

The bellows 82 defines a volume 104 into which liquid 100 is directed via a positive displacement pump indicated at 102.

The bellows 82 is shaped so that, when the pressure at the inlet 18 exceeds, to a certain extent, the pressure within a volume 110 outside the bellows 82, the end 98 of the bellows 82 moves away from the bellows seat 85 to permit the liquid 100 to flow into the volume 110. It will be appreciated that, as before, the plunger 70 will be displaced to accommodate the liquid 100.

The dispensing device 80 is used to dispense predetermined amounts of liquid 100. The amount of liquid dispensed by the dispensing device 80 will depend on the extent of movement of the plunger 70. Thus, the plunger 70 has an adjustable stop in the form of a set screw 106 mounted thereon to permit the extent of movement of the plunger 70 to be adjusted.

When the plunger 70 is depressed, the liquid pressure within the volume 110 exceeds the liquid pressure within the volume 104. The inlet 18 has a greater cross sectional area than the outlet 26. This facilitates the flow of liquid from the volume 104 through the inlet 18 to provide an equalisation of pressure between the volumes 104, 110. The rubber seal 86 thus moves off the seating formation 88 of the second outlet 26 to permit a predetermined quantity of liquid 100 to flow from the outlet 26. Once the plunger 70 has been fully depressed, the pressure at the inlet 18 will again exceed that within the volume 110 and the liquid 100 will again be permitted to flow into the volume 110.

Figure 3:
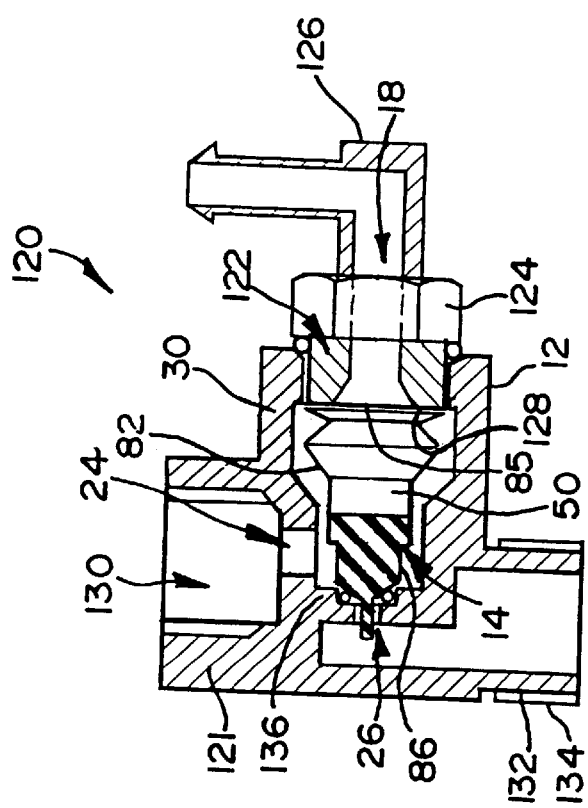
FIG. 3 shows a cross sectioned view of a fluid-operated dispensing device in accordance with a third embodiment of the invention.

In FIG. 3, reference numeral 120 generally indicates a fluid-operated dispensing device in accordance with a third embodiment of the invention. With reference to FIGS. 1 and 2, like reference numerals refer to like parts, unless otherwise specified.

The wall 30 of the dispensing device 120 is defined by a body 121. The body 121 defines a threaded entrance passage 122. An insert in the form of a hexagon head nipple 124 is threadedly received in the passage 122. The nipple 124 has a barbed swivel elbow 126 mounted thereon to facilitate connection of a hose (not shown) to the nipple 124.

The inlet 18 is defined in the nipple 124. An inner end 128 of the nipple 124 defines the bellows seat 85. It will be appreciated that the position of the nipple 124 is adjustable relative to the wall 30. It follows that relative pressures at the inlet 18 and in the chamber 14 necessary to permit operation of the bellows 82 and the second closure 50 can be adjusted.

An O-ring 136 is positioned in the valve body 121 about the outlet opening 26. The seal 86 bears against the O-ring 136 to seal the opening 26 closed, in use.

The dispensing device 120 is particularly suited for use with a drench gun (not shown). The body 121 defines a first threaded socket 130, the first outlet 24 opening into the socket 130. The drench gun is threadedly mounted in the socket 130 and performs the function of the plunger 70 of the first two embodiments.

The body 121 also defines a delivery conduit 132. An outer surface 134 of the conduit 132 is threaded.

In use, a bottle (not shown) is filled with a drenching liquid and connected to the elbow 126.

The drench gun is set to deliver a required volume of the drenching liquid. To expel air in the dispensing device 120, the bottle is pressurised until a plunger of the drench gun is moved back as a result of air pressure build up in the chamber 14. The plunger is then depressed repeatedly until the drencher is filled with the drenching liquid. The required volume of liquid is dispensed each time the plunger is depressed.

In the event of leakage of drenching liquid from the second outlet 26, the nipple 124 is tightened until the leaking ceases. In the event that a force required to depress the plunger is too high, the nipple 124 is loosened.

Figure 4:
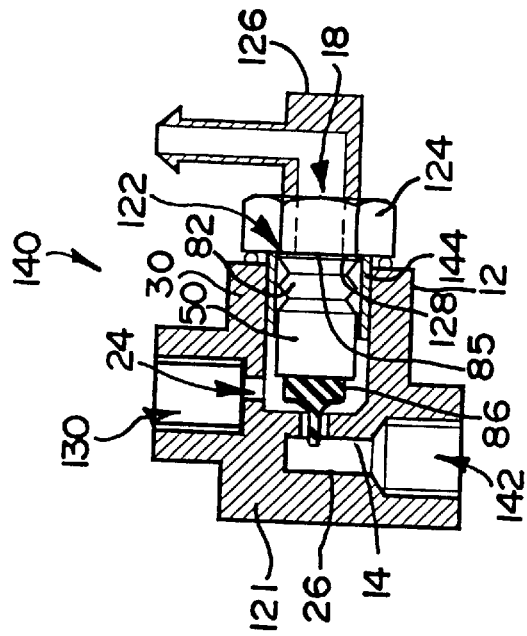
FIG. 4 shows a cross sectioned view of a fluid-operated dispensing device in accordance with a fourth embodiment of the invention.

In FIG. 4, reference numeral 140 generally indicates a fluid-operated dispensing device in accordance with a fourth embodiment of the invention. With reference to FIGS. 1 to 3, like numerals refer to like parts, unless otherwise specified.

The dispensing device 140 is particularly suited for use with a vaccinator (not shown). The vaccinator is mounted on the body 121 via the threaded socket 130. Once again, the vaccinator performs the function of the plunger 70 of the embodiments illustrated in FIGS. 1 and 2 of the drawings.

The body 121 defines a further threaded socket 142 into which the second outlet 26 opens. A vaccination needle (not shown) is connected to the body 121 via the socket 142.

The nipple 124 has a sleeve 144 extending therefrom. The sleeve 144 is threaded and is threadedly received in the passage 122. The bellows 82 is received within the sleeve 144, the bellows seat 85 being positioned within the sleeve 144.

Operation of the dispensing device 140 and the vaccinator is substantially the same as that of the drencher and dispensing device 120. Instead of the bottle of drenching liquid, the elbow 126 is connected to a bottle of vaccine.

It will readily be appreciated that a number of alternatives could be used to achieve the necessary pressure differential which results in the transfer of liquid. An example of such an alternative would be a diaphragm-type arrangement located within the chamber 14.

The applicant believes that the invention provides a dispensing device which is particularly suited for dispensing, repeatedly, accurate, metered quantities of a liquid. It should be noted that the dispensing device 10, 80, 120, 140 is such that, while a quantity of liquid flows into the chamber 14, the second outlet 26 remains closed and while that quantity is discharged from the second outlet 26, the inlet 18 remains closed. In this way, accurate dispensing of liquid can be achieved. Also, during this process air is inhibited from entering the chamber 14.

I claim:

1. A fluid-operated dispensing device which includes a chamber defining means for defining a chamber in which fluid is received, in use, the chamber defining means further defining an inlet which opens into the chamber and a first outlet and a second outlet, both of which open into the chamber, the inlet having a greater cross sectional area than that of the second outlet;

a first closure means operatively arranged with respect to the inlet to be displaceable between a closed position in which the inlet is closed and an open position in which the inlet is open, the first closure means being configured to move into its open position when fluid pressure at the inlet is greater than fluid pressure within the chamber and to move into its closed position when fluid pressure within the chamber is at least equal to fluid pressure at the inlet; and a second closure means operatively arranged with respect to the second outlet to be displaceable between a closed position in which said second outlet is closed and an open position in which said second outlet is open, the second closure means being configured to move into its open position when fluid pressure within the chamber is greater than fluid pressure at the inlet and to move into its closed position when fluid pressure at the inlet is at least equal to fluid pressure within the chamber.

2. The dispensing device as claimed in claim 1, which includes an operating means in fluid communication with the first outlet for varying the fluid pressure in the chamber to permit operation of both closure means.

3. The dispensing device as claimed in claim 2, in which the operating means includes a cylinder mounted on the chamber defining means, an interior of the cylinder being in fluid communication with the first outlet and a plunger being sealingly and slidably located within the cylinder.

4. The dispensing device as claimed in claim 3, in which the operating means includes an adjustable stop arranged on the cylinder and the plunger so that the extent of reciprocal movement of the plunger can be adjusted.

5. The dispensing device as claimed in claim 1, which includes an urging means arranged within the chamber to bias the first and second closure means into their closed positions.

6. The dispensing device as claimed in claim 5, in which the first closure means and the urging means are both defined by a bellows-like element, with the second closure means being mounted on one end of the bellows-like element and an opposed end of the bellows-like element being displaceable towards and away from the inlet between the closed and open positions.

7. The dispensing device as claimed in claim 5, in which the urging means is in the form of a spring interposed between the first closure means and the second closure means.

8. The dispensing device as claimed in claim 1, in which the chamber defining means includes an insert which defines the inlet, the first closure means bearing against the insert when the first closure means is in its closed position, a position of the insert being adjustable relative to the chamber of the chamber defining means to adjust relative pressures at the inlet and in the chamber necessary to permit operation of both closure means.

* * * * *